United States Patent
Lin et al.

(10) Patent No.: US 10,067,668 B2
(45) Date of Patent: Sep. 4, 2018

(54) PORTABLE ELECTRONIC DEVICE, OPERATING METHOD FOR THE SAME, AND NON-TRANSITORY COMPUTER READABLE RECORDING MEDIUM

(71) Applicant: HTC Corporation, Taoyuan (TW)

(72) Inventors: Chia-Yao Lin, Taoyuan (TW); Yen-Hung Lin, Taoyuan (TW); Shih-Lung Lin, Taoyuan (TW); Chia-Chu Ho, Taoyuan (TW); Hsuan-Yi Lee, Taoyuan (TW); Kuan-Wei Li, Taoyuan (TW); Jian-Shuen Chen, Taoyuan (TW); Yu-Hung Chen, Taoyuan (TW); Chun-Hung Hsieh, Taoyuan (TW); Pin-Yu Huang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 15/594,851

(22) Filed: May 15, 2017

(65) Prior Publication Data
US 2018/0074692 A1   Mar. 15, 2018

Related U.S. Application Data

(60) Provisional application No. 62/501,784, filed on May 5, 2017, provisional application No. 62/385,924, filed on Sep. 9, 2016.

(51) Int. Cl.
*G06F 3/0488*   (2013.01)
*G06F 3/0354*   (2013.01)
(Continued)

(52) U.S. Cl.
CPC ...... *G06F 3/04883* (2013.01); *G06F 3/03547* (2013.01); *G06F 3/044* (2013.01);
(Continued)

(58) Field of Classification Search
None
See application file for complete search history.

(56) References Cited

U.S. PATENT DOCUMENTS

2003/0025678 A1*   2/2003   Lee .................. G06F 3/038
                                                        345/173
2013/0300668 A1   11/2013   Churikov et al.
(Continued)

OTHER PUBLICATIONS

U.S. Office Action, dated May 3, 2018, for U.S. Appl. No. 15/699,155.

*Primary Examiner* — Robin Mishler
(74) *Attorney, Agent, or Firm* — Birch, Stewart, Kolasch & Birch, LLP

(57) ABSTRACT

A portable electronic device, an operating method for the same, and a non-transitory computer readable recording medium are provided. The portable electronic device includes a body and an edge sensor disposed adjacent to an edge of the body. The operating method includes the following step. When a plugging-in event or a plugging-out event of a peripheral device is detected by the portable electronic device, a squeezing event sensed by the edge sensor is ignored. The squeezing event may be generated when a squeeze action sensed by the edge sensor occurs during a first time period. The plugging-in event or the plugging-out event may occur during the first time period. Alternatively, the squeeze action may begin within a second time period after the plugging-in event or the plugging-out event occurs.

20 Claims, 21 Drawing Sheets

(51) Int. Cl.
 *G06F 3/044* (2006.01)
 *G06F 3/0487* (2013.01)
 *G06F 3/01* (2006.01)
 *G06T 3/60* (2006.01)

(52) U.S. Cl.
 CPC .......... *G06F 3/0487* (2013.01); *G06F 3/0488* (2013.01); *G06F 3/011* (2013.01); *G06F 2200/1636* (2013.01); *G06F 2200/1637* (2013.01); *G06F 2203/0382* (2013.01); *G06T 3/60* (2013.01); *H04M 2250/22* (2013.01)

(56) References Cited

U.S. PATENT DOCUMENTS

2014/0340338 A1\* 11/2014 Kim ...................... G06F 3/0488
 345/173
2016/0110093 A1 4/2016 S et al.

\* cited by examiner

PORTABLE ELECTRONIC DEVICE, OPERATING METHOD FOR THE SAME, AND NON-TRANSITORY COMPUTER READABLE RECORDING MEDIUM

This application claims the benefit of U.S. provisional application Ser. No. 62/385,924, filed Sep. 9, 2016, and U.S. provisional application Ser. No. 62/501,784, filed May 5, 2017, the subject matters of which are incorporated herein by reference.

BACKGROUND

Technical Field

The disclosure relates to a portable electronic device, an operating method for the same, and a non-transitory computer readable recording medium, and more particularly to a portable electronic device comprising an edge sensor, an operating method for the same, and a non-transitory computer readable recording medium.

Description of the Related Art

Currently, a conventional portable electronic device such as cell phone, etc., has a touch display screen on a front surface of which and provided for displaying an image or sensing a touch action from a user. The portable electronic device can perform a functional operating according to the sensed touch action.

SUMMARY

The present disclosure provides a portable electronic device, an operating method for the portable electronic device, and a non-transitory computer readable recording medium.

According to a concept of the present disclosure, an operating method for a portable electronic device is provided. The portable electronic device comprises a body and an edge sensor disposed adjacent to an edge of the body. The operating method comprises the following step. When a plugging-in event or a plugging-out event of a peripheral device is detected by the portable electronic device, a squeezing event sensed by the edge sensor is ignored. The squeezing event is generated when a squeeze action sensed by the edge sensor occurs during a first time period. The plugging-in event or the plugging-out event occurs during the first time period. Alternatively, the squeeze action begins within a second time period after the plugging-in event or the plugging-out event occurs.

According to another concept of the present disclosure, a non-transitory computer readable recording medium for storing one or more programs is provided. The one or more programs causing a processor to perform the above operating method after the one or more programs are loaded on a computer and are executed.

According to yet another concept of the present disclosure, a portable electronic device is provided. The portable electronic device comprises a body and an edge sensor disposed adjacent to an edge of the body. When a plugging-in event or a plugging-out event of a peripheral device is detected by the portable electronic device, a squeezing event sensed by the edge sensor is ignored by the portable electronic device. The squeezing event may be generated when a squeeze action sensed by the edge sensor occurs during a first time period. The plugging-in event or the plugging-out event may occur during the first time period. Alternatively, the squeeze action begins within a second time period after the plugging-in event or the plugging-out event occurs.

DETAILED DESCRIPTION

The following embodiments disclosed in the specification may be individual embodiments, or may be combined to form other embodiments according to actual demands.

Figure 1:
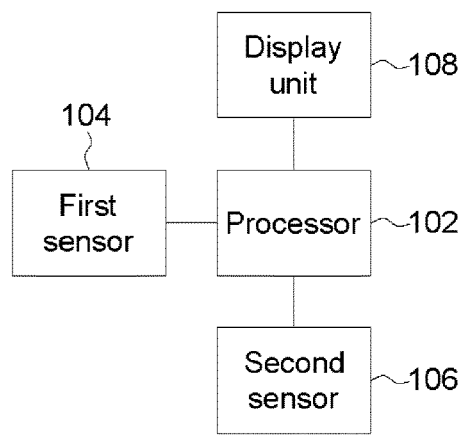
FIG. 1 shows the block diagram of a portable electronic device according to an embodiment of the invention.
Figure 2:
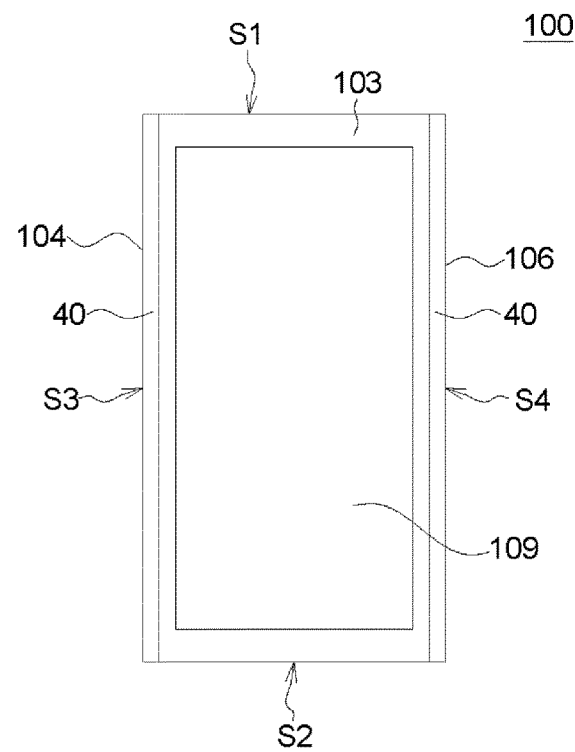
FIG. 2 shows a schematic diagram of the portable electronic device.

FIG. 1 shows the block diagram of a portable electronic device 100 according to an embodiment of the invention. FIG. 2 shows a schematic diagram of the portable electronic device 100. The portable electronic device 100 includes a body 103, processor 102, a first sensor 104, a second sensor 106, and a display unit 108. The first sensor 104 and the second sensor 106 comprises an edge sensor 40 disposed adjacent to an edge of the body 103. The display unit 108 comprises a touch display screen 109 disposed on the body 103. For example, the portable electronic device 100 may be a smart phone or a tablet. The portable electronic device 100 includes a first side S1, a second side S2, a third side S3, and a fourth side S4. The first side S1 and the second side S2 are short sides of the portable electronic device 100, and the third side S3 and the fourth side S4 are long sides of the portable electronic device 100. The first sensor 104 and the second sensor 106 are, for example, pressure sensors, resistive sensors or ultrasonic sensors. The edge sensor 40 may be implemented by at least one of pressure sensor and a touch sensor. Based on the actual needs of the present invention, the first sensor 104 or the second sensor 106 may be disposed on at least one short side of the electronic apparatus, it is not limited thereto.

The processor 102 may include central processing units (CPUs) of the portable electronic device 100 and, thus, control the overall operation of portable electronic device 100. In certain embodiments, the processor 102 accomplishes this by executing software or firmware stored in the memory (not shown). The processor 102 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The touch display screen 109 may include a liquid-crystal display (LCD), a plasma display, a vacuum fluorescent display, a light-emitting diode (LED) display, a field emission display, and/or other suitable types of display configured to display a user interface.

The first sensor 104 and the second sensor 106 are disposed on the third side S3 and fourth side S4 of the portable electronic device 100. The first sensor 104 and the second sensor 106 each includes a plurality of sensing components which are arranged in a line. When a user activates the first sensor 104 or/and the second sensor 106 of the portable electronic device 100 by touching, pressing, sliding, flipping, or squeezing at least one long sides of the portable electronic device 100, these sensing components output corresponding signals. The processor 102 determines the force applied to the sensing components according to the signals outputted from the sensing components of the first sensor 104 or/and the second sensor 106 when the user activates the first sensor 104 or/and the second sensor 106 of the portable electronic device 100. The processor 102 determines the activated positions on the long side of the portable electronic device 100 according to the positions of the sensing components which are activated by the user. The user actions on the portable electronic device 100 can be determined by the processor 102 according to the force applied and the positions activated. The user actions may include squeezing the portable electronic device 100 (e.g., press the first sensor 104 and the second sensor 106 together), sliding on the long side of the portable electronic device 100, pressing on the long side of the portable electronic device 100, and flipping the edge on the long side of the portable electronic device 100.

Referring to Tables 1-1, 1-2 and 1-3, the corresponding operations of the portable electronic device 100 are performed according to the user actions and the status of portable electronic device 100.

TABLE 1-1

| User action | Status | | | |
|---|---|---|---|---|
| | Screen off (A) | Screen on (Global) (B) | Camera (C) | Video (D) |
| Flip the edge (1) | Edge sense panel | Edge sense panel | Edge sense panel | Edge sense panel |
| Squeeze (2) | None | None | Take photo/video | Pause/play |
| Long squeeze(3) | Voice record/note | Voice record/note | Voice record/note | Voice record/note |
| Double squeeze (4) | Launch camera | Launch camera | None | Launch camera |
| Slide (5) | None | Scroller | Brightness and Zoom | Brightness and progress bar |
| Slide both sides (6) | Screen capture | Screen capture | Screen capture | Screen capture |
| Press volume position (7) | Volume | Volume | Volume | Volume |
| Hold and quick slide (8) | Launch flashlight | Launch flashlight | Launch flashlight | Launch flashlight |
| Press L/R side in landscape (9) | None | None | None | None |

TABLE 1-2

| User action | Status | | | |
|---|---|---|---|---|
| | Music (E) | Gaming (F) | Incall (G) | Alarm/alert (H) |
| Flip the edge (1) | Edge sense panel | Edge sense panel | Edge sense panel | Edge sense panel |
| Squeeze (2) | Pause/play | Pause/play | None | Snooze |
| Long squeeze(3) | Voice record/note | Voice record/note | End call | Dismiss |

TABLE 1-2-continued

| User action | Status | | | |
|---|---|---|---|---|
| | Music (E) | Gaming (F) | Incall (G) | Alarm/alert (H) |
| Double squeeze (4) | Launch camera | Launch camera | Launch camera | Launch camera |
| Slide (5) | Brightness and progress bar | Dismiss notification and DND | None | None |
| Slide both sides (6) | Screen capture | Screen capture | Screen capture | Screen capture |
| Press volume position (7) | Volume | Volume | Volume | Volume |
| Hold and quick slide (8) | Launch flashlight | Launch flashlight | Launch flashlight | Launch flashlight |
| Press L/R side in landscape (9) | None | Screen record widget | None | None |

TABLE 1-3

| User action | Status | | | |
|---|---|---|---|---|
| | Incoming call (I) | Instant Message (IM)/ Message with input method editor (IME) (J) | IM/ Message without IME (K) | Web/photo (L) |
| Flip the edge (1) | Edge sense panel | Edge sense panel | Edge sense panel | Edge sense panel |
| Squeeze (2) | Answer | None | None | None |
| Long squeeze (3) | Decline | Voice input | Record and send voice message | Voice record/ note |
| Double squeeze (4) | Launch camera | Launch camera | Launch camera | Launch camera |
| Slide (5) | None | None | None | Scroller |
| Slide both sides (6) | Screen capture | Screen capture | Screen capture | Screen capture |
| Press volume position (7) | Volume | Volume | Volume | Volume |
| Hold and quick slide (8) | Launch flashlight | Launch flashlight | Launch flashlight | Launch flashlight |
| Press L/R side in landscape (9) | None | None | None | None |

Figure 3:
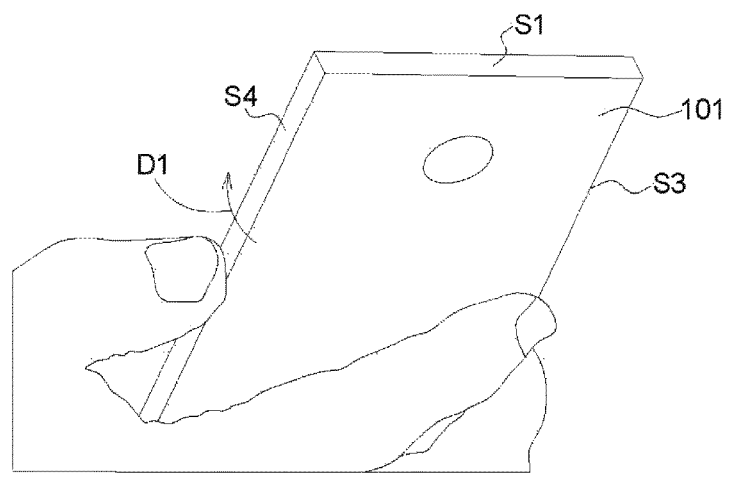
FIG. 3 shows a schematic diagram of the portable electronic device when the user flips the edge.
Figures 4A, 4B:
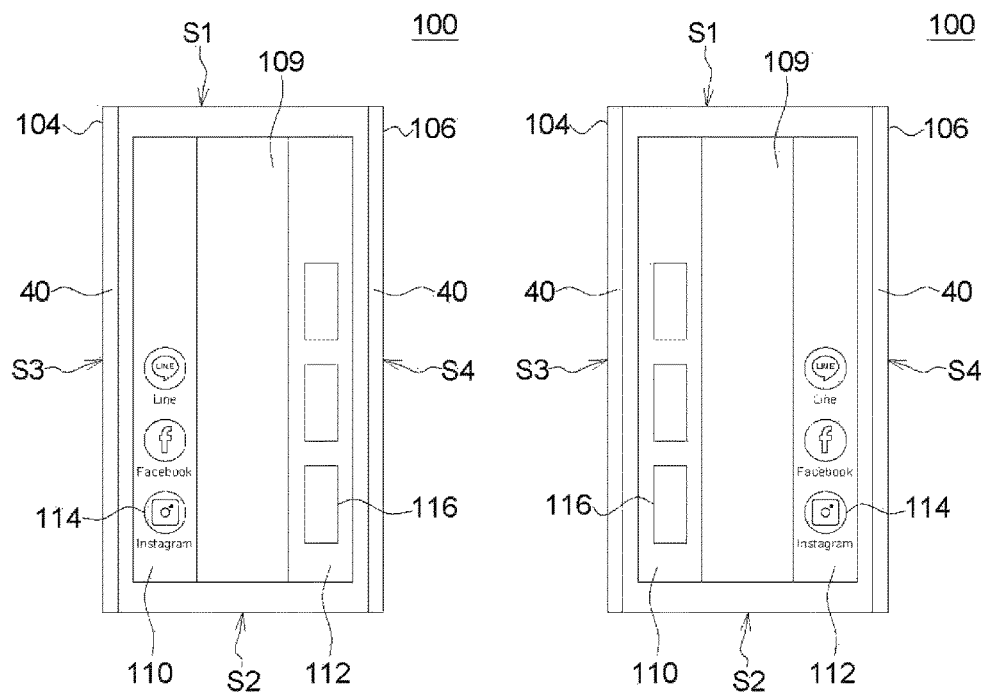
FIG. 4A shows a schematic diagram of the edge sense panel according to an embodiment of the invention.
FIG. 4B shows a schematic diagram of the edge sense panel according to another embodiment of the invention.

The corresponding operations are performed when the user flips the edge (user action 1) in different statuses of the portable electronic device 100. For example, when the screen of the portable electronic device 100 is turned on/off (status B/A), a camera of the portable electronic device 100 is launched (status C), the user watches the video (status D), listens to the music (status E), plays the games (status F) on the portable electronic device 100, the user is in a call (status G), an alarm/alert rings (status H), the user has an incoming call (status I), the user writes the Instant Message (IM)/ message with input method editor (IME) (status J), the user writes the IM/message without IME (status K), or the user browses the web/photo (status L), the user flips the edge to trigger the function of showing the edge sense panel on the touch display screen 109. Referring to FIG. 3, FIG. 3 shows a schematic diagram of the handheld 100 when the user flips the edge. The user action "flip the edge" represents that the user holds the portable electronic device 100, and uses one finger (for example, a thumb) to touch one of the long sides and moves the finger along a direction D1 from the rear cover 101 to the screen. The user action "flip the edge" is determined by the processor 102 when the signal outputted from at least one of the sensing components in the first sensor 104 or/and the second sensor 106 and the touch signal outputted from the edge of the touch display screen 109, representing that the one finger touching the long side and moving along the direction D1 and finally leaving from the edge of the touch display screen 109, are detected within a specific time period. Referring to FIG. 4A and FIG. 4B, a schematic diagram of the edge sense panel is shown. The edge sense panel includes a first displaying area 110 and a second displaying area 112. The first displaying area 110 and the second displaying area 112 are displayed on the touch display screen 109 and near the long sides S3 and S4. The first displaying area 110 and the second displaying area 112 display the shortcut icon 114 and information 116, such that the user can touch the shortcut icon 114 and information 116 easily. The shortcut icon 114 corresponds to application, for example, "Instagram", "Facebook" or "Line". When the user touches on the shortcut icon 114, the corresponding application launches. The information 116 can include but not limit to images, weather or news. FIG. 4A shows a schematic diagram of the edge sense panel according to an embodiment of the invention. FIG. 4B shows a schematic diagram of the edge sense panel according to another embodiment of the invention. In one embodiment, when the user holds the portable electronic device 100 by the left hand and uses the left thumb to flip the edge on the third side S3, the touch display screen 109 displays the edge sense panel in which the shortcut icons 114 are displayed in the first displaying area 110 and the information 116 is displayed in the second displaying area 112 (as shown in FIG. 4A). When the user holds the portable electronic device 100 by the right hand and uses the right thumb to flip the edge on the fourth side S4, the touch display screen 109 displays the edge sense panel in which the information 116 is displayed in the first displaying area 110 and the shortcut icons 114 are displayed in the second displaying area 112 (as shown in FIG. 4B). In one embodiment, an indicator is displayed on one of the shortcut icons 114 or any information 116. The user can move the indicator by sliding and pressing on the long side of the portable electric device 100 so as to select and execute one of the shortcut icons 114 or display one information 116.

Figure 5:
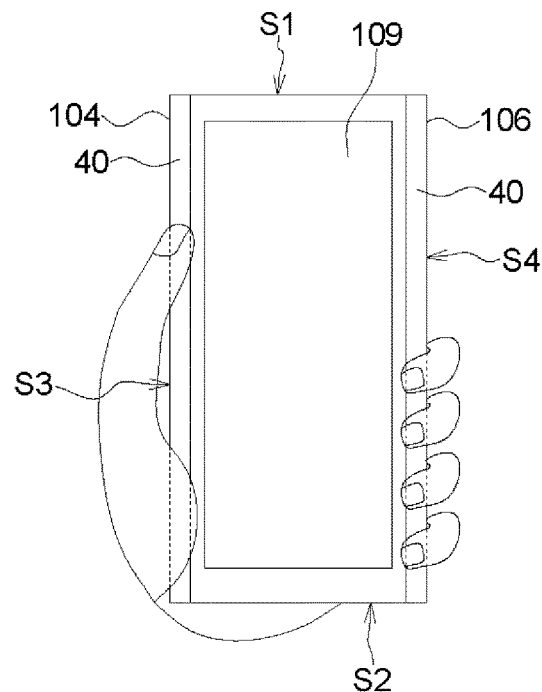
FIG. 5 shows a schematic diagram of the portable electronic device when the user squeezes the portable electronic device.

The corresponding operations are performed when the user squeezes the portable electronic device 100 (user action 2) in different statuses of the portable electronic device 100. For example, when a camera of the portable electronic device 100 is launched (status C), the user squeezes the portable electronic device 100 to take a photo or record a video. When the user watches video (status D), listens to music (status E), or plays games on the portable electronic device 100 (status F), the user squeezes the portable electronic device 100 to pause/play the video, the music or the games. When an alarm/alert rings (status H), the user squeezes the portable electronic device 100 to snooze the alarm/alert. When the user has an incoming call (status I), the user squeezes the portable electronic device 100 to answer the incoming call. Referring to FIG. 5, FIG. 5 shows a schematic diagram of the portable electronic device 100 when the user squeezes the portable electronic device 100.

The user action "squeeze" represents that the user holds the portable electronic device 100, and presses the portable electronic device 100 firmly with fingers or hands. The user action "squeeze" is determined by the processor 102 when the signal level of the signals outputted from the sensing components of the first sensor 104 and the second sensor 106 exceed a force threshold.

The corresponding operations are performed when the user long squeezes the portable electronic device 100 (user action 3) in different statuses of the portable electronic device 100. For example, when a screen of the portable electronic device 100 is turned on/off (status B/A), a camera of the portable electronic device 100 is launched (status C), the user watches the video (status D), listens to the music (status E), plays the games on the portable electronic device 100 (status F), or the user browses the web/photo (status L), the user long squeezes the portable electronic device 100 to take notes by voice or typing. When the user is in a call (incall) (status G), the user long squeezes the portable electronic device 100 to end the call. When an alarm/alert rings (status H), the user long squeezes the portable electronic device 100 to dismiss the alarm/alert. When the user has an incoming call (status I), the user long squeezes the portable electronic device 100 to decline the incoming call. When the user writes the IM/message with IME (status K), the user long squeezes the portable electronic device 100 to type with the voice (voice input). When the user writes the IM/message without IME (status L), the user long squeezes the portable electronic device 100 to record and send the voice message. The user action "long squeeze" represents that the user squeezes the portable electronic device 100 for a certain time longer than a time threshold. For example, the user action "long squeeze" is determined by the processor 102 when the user squeezes the portable electronic device 100 for more than 3 seconds.

The corresponding operations are performed when the user double squeezes the portable electronic device 100 (user action 4) in different statuses of the portable electronic device 100. For example, when the screen of the portable electronic device 100 is turned on/off (status B/A), the user watches the video (status D), listens to the music (status E), plays the games on the portable electronic device 100 (status F), the user is in a call (status G), an alarm/alert rings (status H), the user has an incoming call (status I), the user writes the IM/message with IME (status J), the user writes the IM/message without IME (status K), or the user browses the web/photo (status L), the user double squeezes the portable electronic device 100 to launch the camera. The user action "double squeeze" represents that the user squeezes the portable electronic device 100 two times within a certain time interval. For example, the user action "double squeeze" is determined by the processor 102 when the user squeezes the portable electronic device 100 two times within two seconds. In one embodiment, the corresponding operation for the user action "double squeeze" is customizable. That is, the user can reset the corresponding operation. For example, the corresponding operation "launch camera" is reset to "launch the favorite apps".

Figure 6:
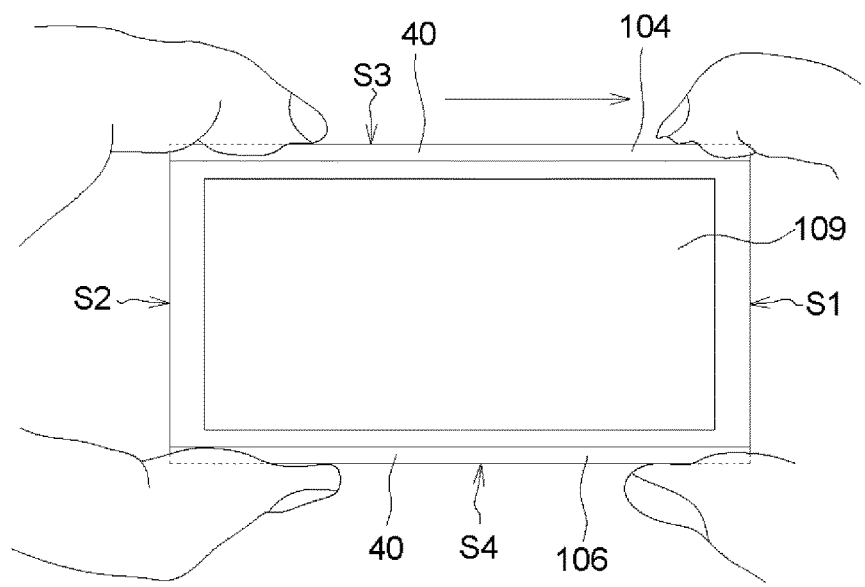
FIG. 6 shows a schematic diagram of the portable electronic device when the user finger slides on one of the two long sides of the portable electronic device.

The corresponding operations are performed when the user slides on one of the two long sides of the portable electronic device 100 (user action 5) in different statuses of the portable electronic device 100. The user action "slide" is determined by the processor 102 when the sensing components in the first sensor 104 or/and the second sensor 106 continuously and sequentially output the sensing signals within a specific time period corresponding to the slide action made by the user. For example, when the screen of the portable electronic device 100 is turned on (status B), or the user browses the web/photo (status L), the user slides on the side of the portable electronic device 100 to scroll the page/content displayed on the touch display screen 109. When a camera of the portable electronic device 100 is launched (status C), the user finger slides on the up side (the third side S3) of the portable electronic device 100 in landscape mode to adjust the brightness or slides on the bottom side (the fourth side S4) of the portable electronic device 100 in landscape mode to zoom the content displayed on the touch display screen 109. When the user watches the video (status D), the user finger slides on the up side (the third side S3) of the portable electronic device 100 in landscape mode to adjust the brightness or slides on the bottom side (the fourth side S4) of the portable electronic device 100 in landscape mode to adjust the progress bar. When the user listens to the music (status E), the user finger slides on one of the third side S3 and the fourth side S4 to adjust the progress bar. When the user plays the game (status F), the user finger slides on the up side (the third side S3) of the portable electronic device 100 in landscape mode to dismiss the notification and turn on do not disturb (DND). Referring to FIG. 6, FIG. 6 shows a schematic diagram of the portable electronic device 100 when the user finger slides on one of the two long sides of the portable electronic device 100. The user action "slide" represents that the user holds the portable electronic device 100, and uses one finger to touch one of the long sides and moves the finger along the touched long side.

Figure 7:
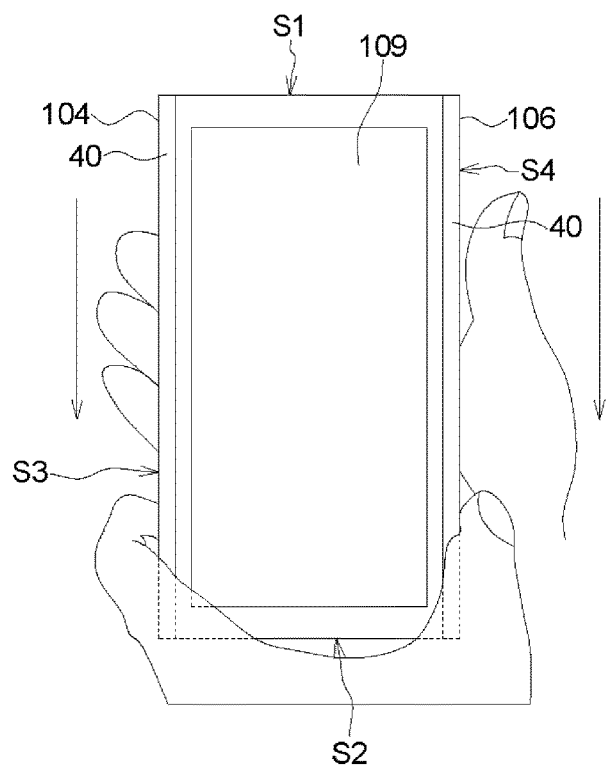
FIG. 7 shows a schematic diagram of the portable electronic device when the user finger slides on both long sides of the portable electronic device.

The corresponding operations are performed when the user finger slides on both long sides of the portable electronic device 100 (user action 6) in different statuses of the portable electronic device 100. For example, when the screen of the portable electronic device 100 is turned on/off (status B/A), a camera of the portable electronic device 100 is launched (status C), the user watches the video (status D), listens to the music (status E), plays the games on the portable electronic device 100 (status F), the user is in a call (status G), an alarm/alert rings (status H), the user has an incoming call (status I), the user writes the IM/message with IME (status J), the user writes the IM/message without IME (status K), or the user browses the web/photo (status L), the user finger slides on the both long sides of the portable electronic device 100 to capture the page/content displayed on the touch display screen 109 (screen capture). Referring to FIG. 7, FIG. 7 shows a schematic diagram of the portable electronic device 100 when the user finger slides on both long sides of the portable electronic device 100. The user action "slide both sides" represents that the user holds the portable electronic device 100, and uses two fingers to touch both long sides and moves the two fingers along the both long sides simultaneously.

The corresponding operations are performed when the user presses on a volume position (user action 7) in different statuses of the portable electronic device 100. The volume position is a specific position on the long sides. For example, when the screen of the portable electronic device 100 is turned on/off (status E), a camera of the portable electronic device 100 is launched (status C), the user watches the video (status D), listens to the music (status E), plays the games on the portable electronic device 100 (status F), the user is in a call (status G), an alarm/alert rings (status H), the user has an incoming call (status I), the user writes the IM/message with IME (status J), the user writes the IM/message without IME (status K), or the user browses the web/photo (status L), the user presses on the volume position on one of the two long sides of the portable electronic device 100 to adjust the volume.

Figure 8:
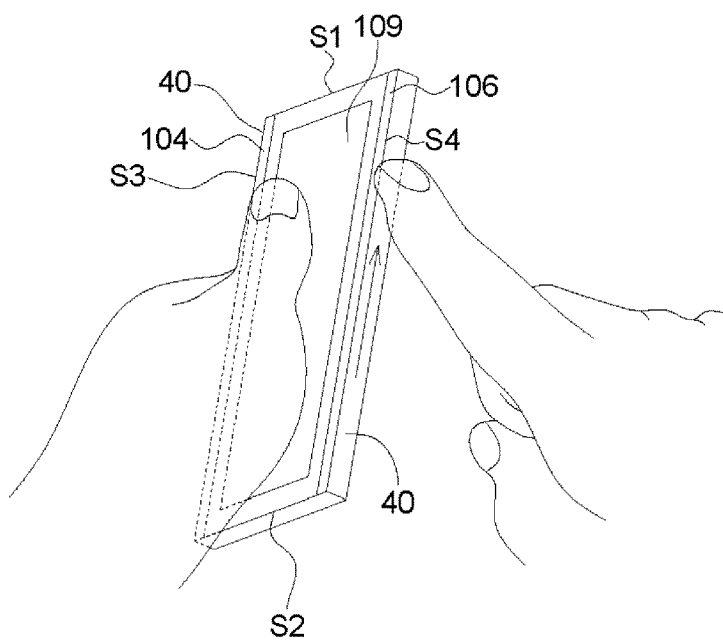
FIG. 8 shows a schematic diagram of the portable electronic device when the user finger slides on one of the two long sides of the portable electronic device quickly.

The corresponding operations are performed when the user holds the portable electronic device 100 and quickly slides on one of the two long sides (user action 8) in different statuses of the portable electronic device 100. For example, when the screen of the portable electronic device 100 is turned on/off (status B/A), the user watches the video (status D), listens to the music (status E), plays the games on the portable electronic device 100 (status F), the user is in a call (status G), an alarm/alert rings (status H), the user has an incoming call (status I), the user writes the IM/message with IME (status J), the user writes the IM/message without IME (status K), or the user browses the web/photo (status L), the user holds the portable electronic device 100 and slides on one of the two long sides quickly to launch/dismiss the flashlight. Referring to FIG. 8, FIG. 8 shows a schematic diagram of the portable electronic device 100 when the user finger slides on one of the two long sides quickly of the portable electronic device 100. The user action "quick slide" represents that the user quickly slides on one of the two long sides for a distance larger than a distance threshold in a predefined period. For example, the user action "quick slide" is determined by the processor 102 when the user slides on one of the two long sides over 5 centimeters. In one embodiment, the corresponding operation for the user action "quick slide" is customizable. That is, the user can reset the corresponding operation. For example, the corresponding operation "launch/dismiss the flashlight" is reset to "turn on a silent/do not disturb (DND) mode", "turn on an airplane mode", or "turn on Wi-Fi hotspot".

Figure 9:
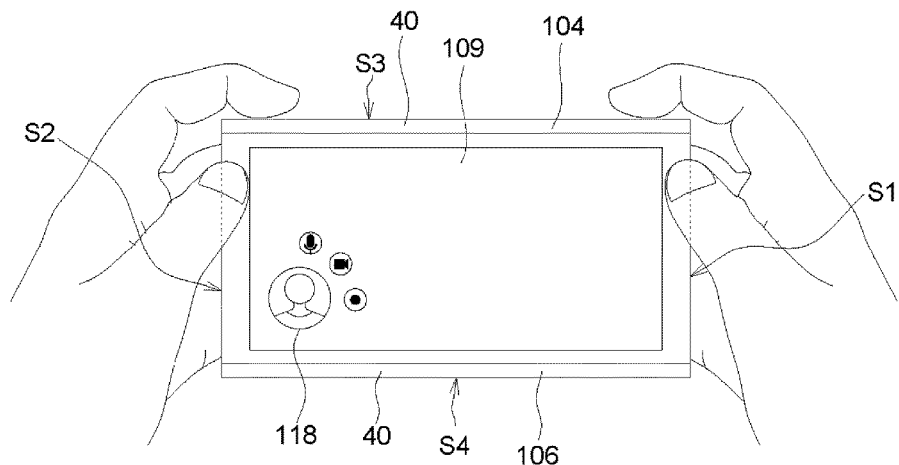
FIG. 9 shows a schematic diagram of the portable electronic device when the user presses on the left and right parts on one of the long sides simultaneously in the landscape mode of the portable electronic device.

The corresponding operations are performed when the user presses on the left and right parts on one of the long sides in the landscape mode (user action 9) in different statuses of the portable electronic device 100. For example, when the user plays the games in the landscape mode on the portable electronic device 100 (status F), the user presses the left and right parts on one of the long sides (for example, side S3) simultaneously in the landscape mode to launch the screen record widget. Referring to FIG. 9, FIG. 9 shows a schematic diagram of the portable electronic device 100 when the user presses on the left and right parts on one of the long sides simultaneously in the landscape mode of the portable electronic device 100. The screen record widget 118 is a control interface for the game.

Figure 10:
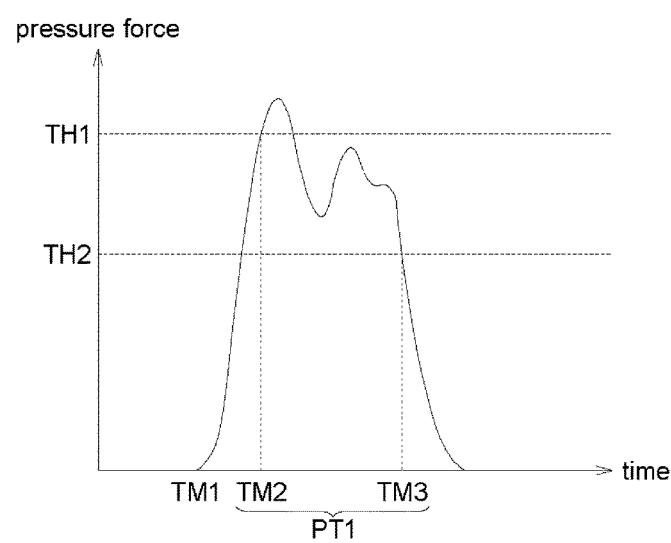
FIG. 10 shows a curve with relation of a time and pressure force according to an embodiment.

Since the user may not keep their force in the same level during squeezing, the user's force of squeeze action is not a perfect curve in real world and may be a little up and down. In order to improve the successful rate of determining whether the squeeze action is performed, different thresholds for squeezing and releasing are set. For example, referring to FIG. 10, a squeezing threshold TH1 is set for determining if a squeeze action begins, and a releasing threshold TH2 is set for determining if the squeeze action finishes. The releasing threshold TH2 is smaller than the squeezing threshold TH1.

The squeezing threshold TH1 may be set through testing user's squeezing force during a squeezing setting procedure of the portable electronic device 100. The releasing threshold TH2 may be set according to the squeezing threshold TH1.

The squeezing setting procedure may comprise asking the user to squeeze the portable electronic device 100, sensing test pressing forces F1 of user's squeezing the portable electronic device 100 with intention to trigger a functional operation of the portable electronic device 100 for several times, and determining a set pressing force F2 to be the squeezing threshold TH1 according to the test pressing forces F1.

The set pressing force F2 may be a percentile value of the test pressing forces F1. For example, in an embodiment, the test pressing forces F1 may be 100, 150, and 200 (pressure units), and the set pressing force F2 (or the squeezing threshold TH1) is 175 (pressure units) being a percentile value of $75^{th}$ percentile calculated according to the minimum value of 100 (pressure units) and the maximum value of 200 (pressure units). The present disclosure is not limited thereto. In another embodiment, for example, the test pressing forces F1 may be 100, 150, and 200 (pressure units), and the set pressing force F2 (or the squeezing threshold TH1) is 150 (pressure units), being an average value of the three test pressing forces F1.

In an embodiment, two or more the set pressing forces F2 can be set through the squeezing setting procedures. The set pressing forces F2 may be sorted in order (for example corresponding to 100, 150, 200 (pressure units) in sequence of size) as icons in a user interface, and one (for example 150 (pressure units)) of the two or more set pressing force F2 can be selected by the user as the squeezing threshold TH1. Then, if the user feels that the one set pressing force F2 (for example 150 (pressure units)) being the squeezing threshold TH1 does not fit for actual use, the user can set another one of the two or more set pressing force F2 as the squeezing threshold TH1. For example, the user may reset 100 (pressure units) as the squeezing threshold TH1, which is lower than 150 (pressure units), as the user feels that 150 (pressure units) is too high; or reset 200 (pressure units) as the squeezing threshold TH1, which higher than 150 (pressure units), as the user feels that 150 (pressure units) is too low).

The releasing threshold TH2 may be determined by the processor 102 according to the squeezing threshold TH1. In an embodiment, the releasing threshold TH2 may be a specific ratio (smaller than 100%) of the squeezing threshold TH1. For example, the value of the releasing threshold TH2 is 75% of the value of the squeezing threshold TH1. For example, assume the squeezing threshold TH1 is 175 (pressure units), then the releasing threshold TH2 is 131.25 (pressure units).

After the squeezing threshold TH1 and the releasing threshold TH2 are set, when a pressing force of a pressing action beginning at a time point TM1 reaches the squeezing threshold TH1 at the time point TM2, the squeeze action is determined as being beginning by the processor 102. On the contrary, as the pressing force of the pressing action beginning at the time point TM1 does not reach the squeezing threshold TH1, no squeeze action is determined by the processor 102. For example, the pressing action without reaching the squeezing threshold may comprise a normal holding action on the portable electronic device 100 by the user, and no functional operation of the portable electronic device 100 is triggered or determined by the processor 102. As long as the pressing force after reaching the squeezing threshold TH1 is lower than the releasing threshold TH2, it is determined by the processor 102 that the squeeze action of the user finishes.

A time period PT1 between a time point TM2 and a time point TM3 corresponding to the squeezing threshold TH1 and the releasing threshold TH2 respectively is determined by the processor 102 as a time period of the squeeze action. The squeeze action can be determined by the processor 102 as a long squeeze action or a short squeeze action according to the time period PT1 between the time point TM2 and the time point TM3, comparing to a time threshold. In an embodiment, when the period time PT1 is less than or equal to 0.7 seconds as the time threshold, the squeeze action is determined to be the short squeeze action. On the contrary, when the period time PT1 is more than 0.7 seconds as the time threshold, the squeeze action is determined to be the long squeeze action.

A functional operational of the portable electronic device 100 may be determined by the processor 102 according to the squeeze action (the long squeeze action or the short squeeze action). A functional action corresponding to the sensed short/long squeeze action may be carried out by the portable electronic device 100. In another embodiment, only the long squeeze action will trigger some particular functional action of the portable electronic device 100, while only the short squeeze action will be ignored by the portable electronic device 100.

Figure 11:
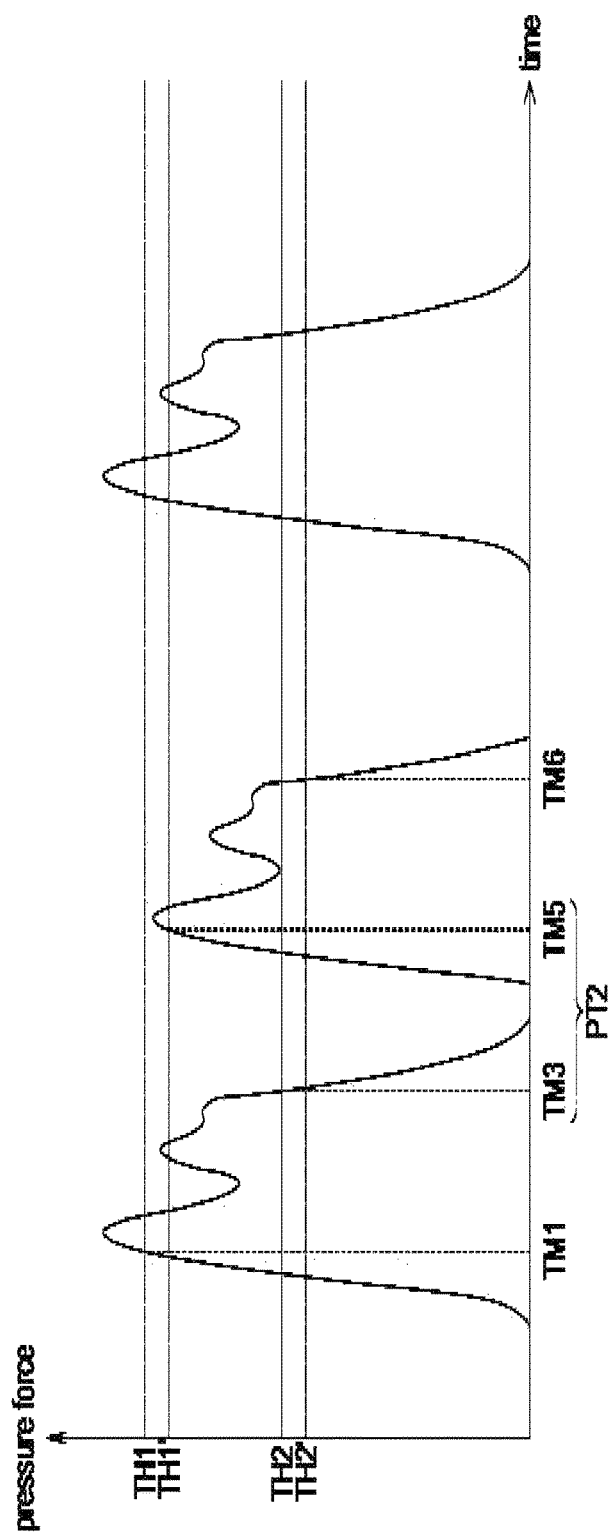
FIG. 11 shows a curve with relation of a time and pressure force according to an embodiment.

A squeeze action may be determined according to other dynamic thresholds modified from the squeezing threshold TH1 or the releasing threshold TH2. For example, if two or more squeeze actions are performed by the user with a short interval, for example for carrying out a picture capturing function rapidly and continuously, a subsequent squeeze action (or subsequent squeeze actions) after the first squeeze action may be determined according to the modified squeezing threshold TH1' and the modified releasing threshold TH2' obtained according to the squeezing threshold TH1 and the releasing threshold TH2, and smaller than the squeezing threshold TH1 and the releasing threshold TH2, respectively. For example, TH1'=0.95*(TH1) and TH2'=0.95*(TH2). However, the present disclosure is not limited thereto. As shown in FIG. 11, in an embodiment, if an interval between the first squeeze action and a second squeeze action, for example determined according to a period time PT2 between a time point TM5 of the second squeeze action and time point TM3 of the first squeeze action, is shorter than a specific value, the second squeeze action can be determined by the modified squeezing threshold TH1' and the modified releasing threshold TH2'. Similarly, if an interval between the second squeeze action and a third squeeze action is shorter than the specific value, the third squeeze action can be determined by another modified thresholds TH1" and TH2" (not shown) obtained according to and smaller than the modified thresholds TH1' and TH2' respectively. For example, TH1"=0.95*(TH1') and TH2"=0.95*(TH2'). On the contrary, if the interval between the second squeeze action and the third squeeze action is larger than the specific value, the third squeeze action can be determined to be another first squeeze action that can be determined by the thresholds TH1 and TH2.

Figure 12:
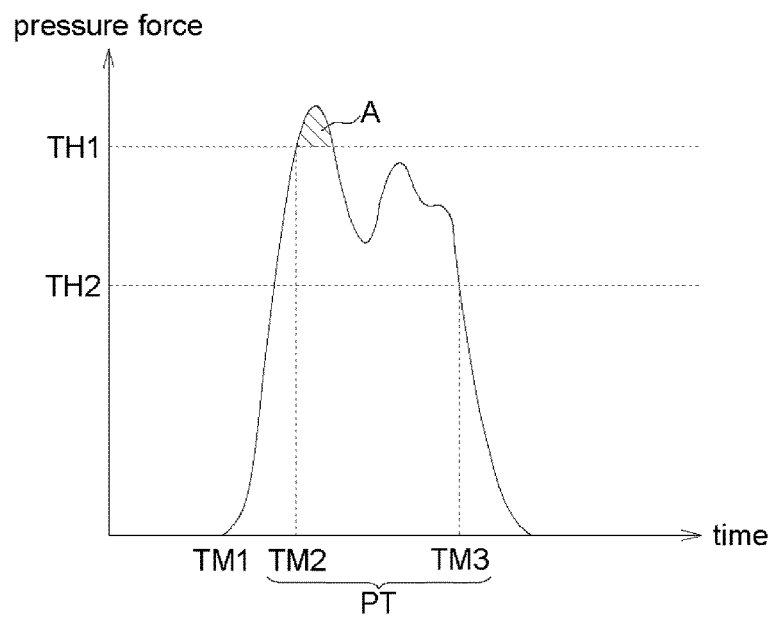
FIG. 12 shows a curve with relation of a time and pressure force according to an embodiment.

In another embodiment, the squeezing threshold can be adjusted dynamically. A dynamic squeezing threshold other than the squeezing threshold TH1 obtained by the setting procedure can be obtained according to use's usual squeeze action not for the setting. For example, an average value in an area A (FIG. 12) defined by the squeezing curve and the squeezing threshold TH1 is compared to a fixed specific value. For example, the average value in an area A may be a pressure unit value calculated by dividing the area A by the time period of the area A. As the average value in the area A is judged as being smaller than the fixed specific value, a dynamic squeezing threshold higher than the squeezing threshold TH1 and fitting the fixed specific value (for example based on the time period of the area A) is set, and then a subsequent squeeze action is determined according to the adjusted dynamic squeezing threshold. Similarly, as the average value of the area A is judged as being more than the fixed specific value, a dynamic squeezing threshold lower than the squeezing threshold TH1 and fitting the fixed specific value is set, and then a subsequent squeeze action is determined according to the adjusted dynamic squeezing threshold.

In an embodiment, a curve judged to be resulted from an un-normal squeeze action is not considered for obtaining the dynamic squeezing threshold. For example, it is judged according to a curvature value of a top point of the curve corresponding the area A, or a slope value of a portion near the top point of the curve. As the curvature value or the slope value is smaller than a fixed specific value, the squeeze action is determined as being an un-normal action, and data obtained from which is not considered for the dynamic squeezing threshold.

Figure 13A:
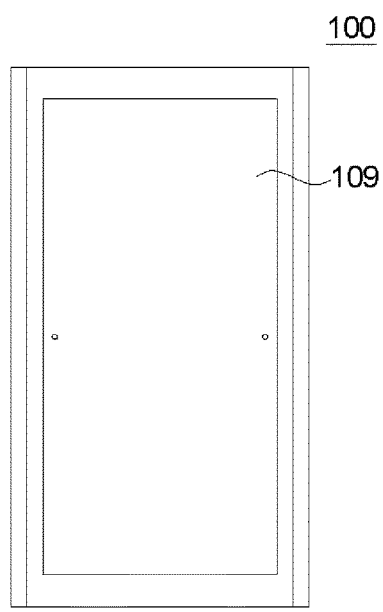
FIG. 13A to 13I show visual images shown on a touch display screen and varying in order during a pressing action on the portable electronic device.
Figure 13B:
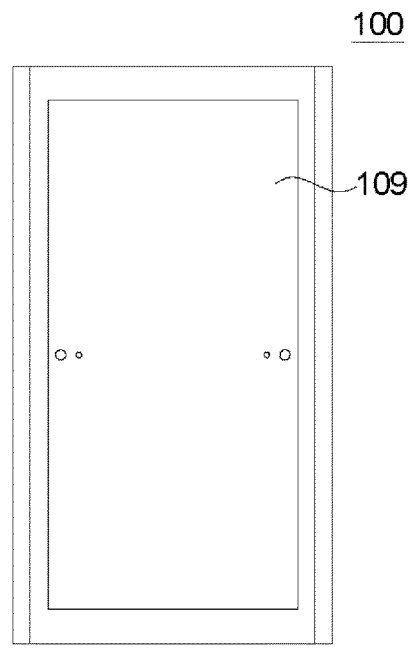
Figure 13C:
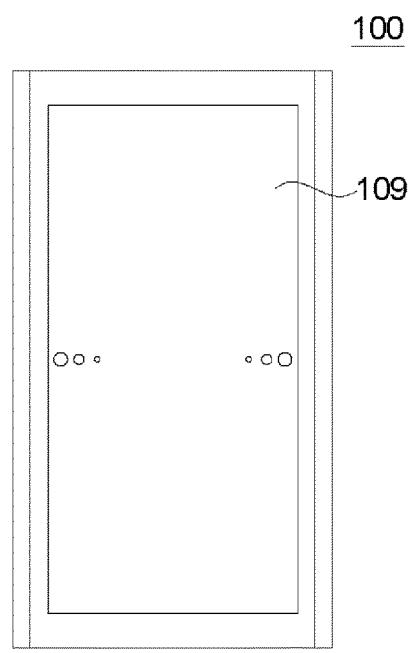
Figure 13D:
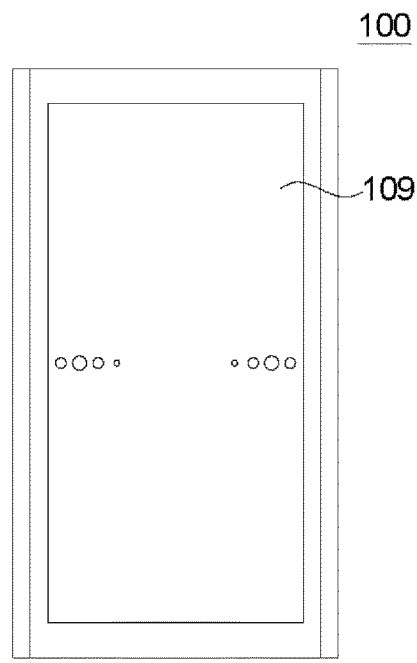
Figure 13E:
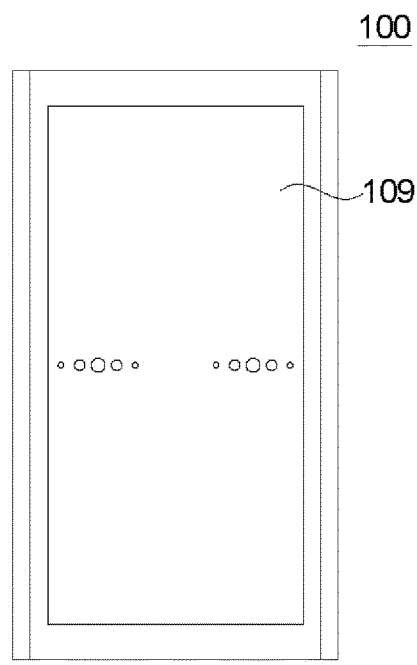
Figure 13F:
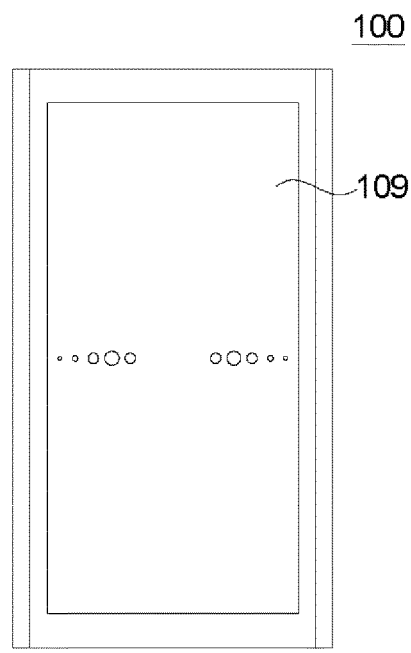
Figure 13G:
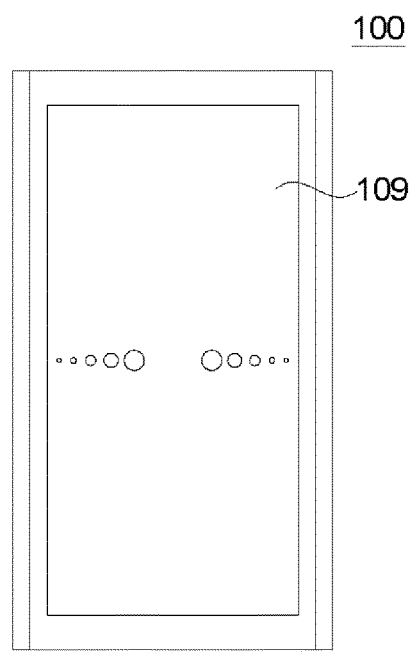
Figure 13H:
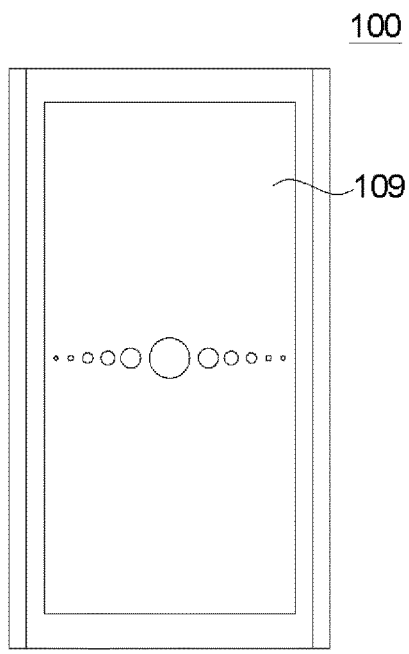
Figure 13I:
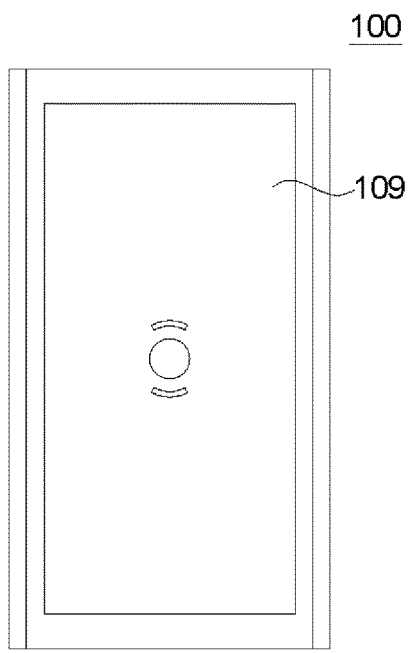
Figure 14A:
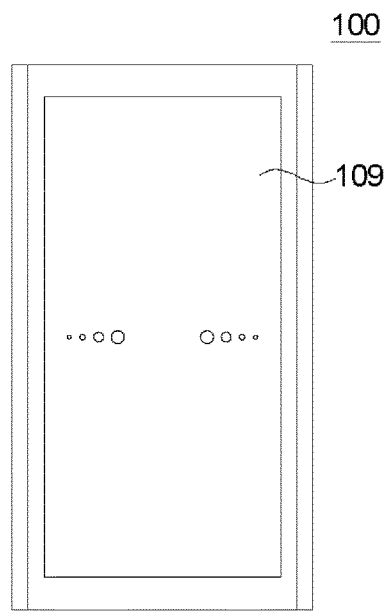
FIG. 14A to FIG. 14D show visual images shown on a touch display screen and varying in order during a pressing action on the portable electronic device.
Figure 14B:
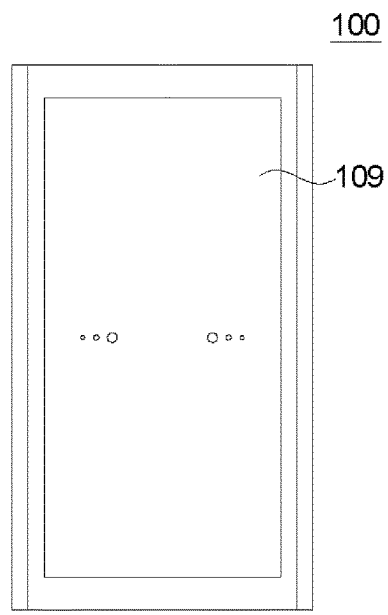
Figure 14C:
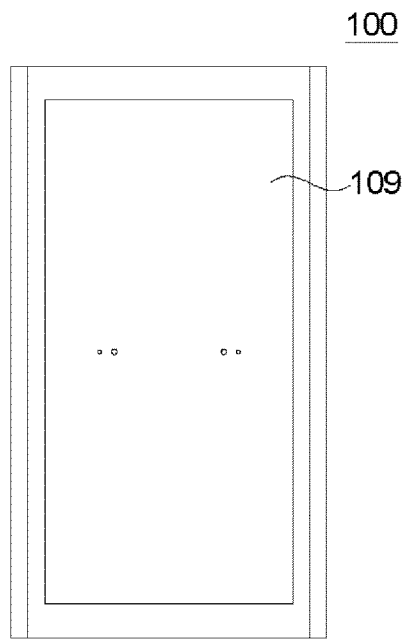
Figure 14D:
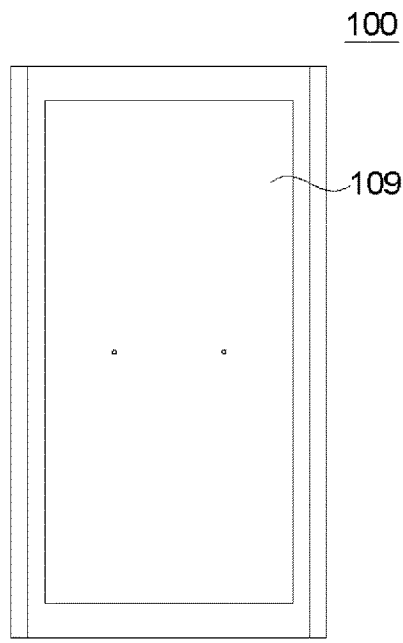
Figure 15:
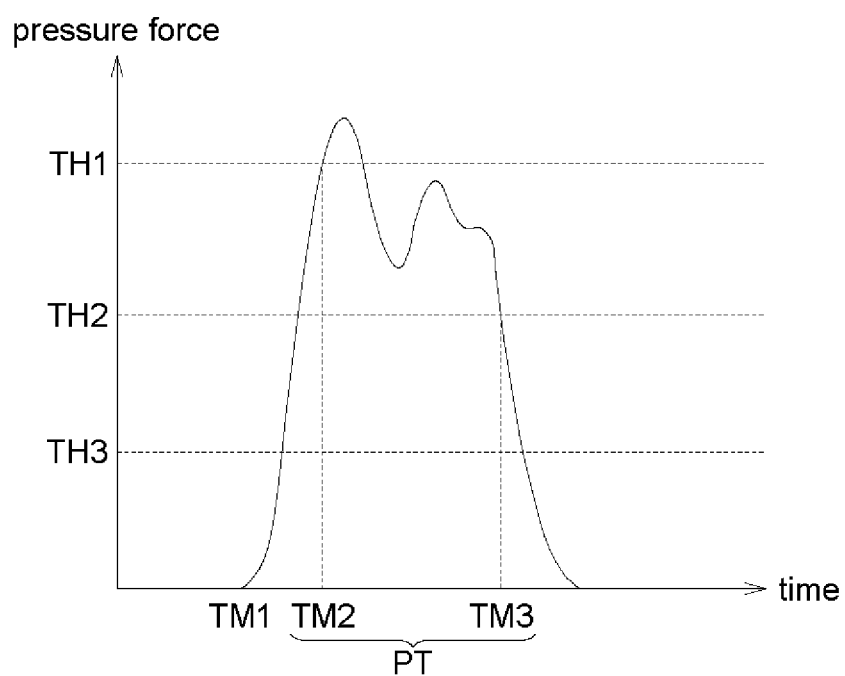
FIG. 15 shows a curve with relation of a time and pressure force according to an embodiment.

The pressing force during the pressing action can be shown as a visual image in the touch display screen 109 of the portable electronic device 100. In an embodiment, the touch display screen 109 starts displaying an initial visual image (FIG. 13A) corresponding to a specific fixed pressure force TH3 as shown in FIG. 15. The specific pressure force TH3 is lower than any one of the thresholds (such as TH1, TH1', TH1", etc., TH2, TH2', TH2", etc.) for determining whether the squeeze action is performed. The specific pressure force TH3 may be a fixed predetermined value without considering the setting procedure performed by the user. In a successful squeezing process, when the pressing force increases from the specific pressure force TH3, the visual image gradually changes to be images as shown in FIG. 13B to FIG. 13G in sequence, and further changes to be images as shown in FIG. 13H to FIG. 13I when the pressing force reaches to the threshold TH1 for indicating that the squeezing action is performed. In an un-successful squeezing process, for example, when the pressing force increases from the specific pressure force TH3, the visual image gradually changes to be images as shown in FIG. 13B to FIG. 13G in sequence, and further changes to be gradually disappearing images as shown in FIG. 14A to FIG. 14D in sequence when the pressing force disappears from the time point corresponding FIG. 14I, indicating that no squeezing action is performed.

Figure 16:
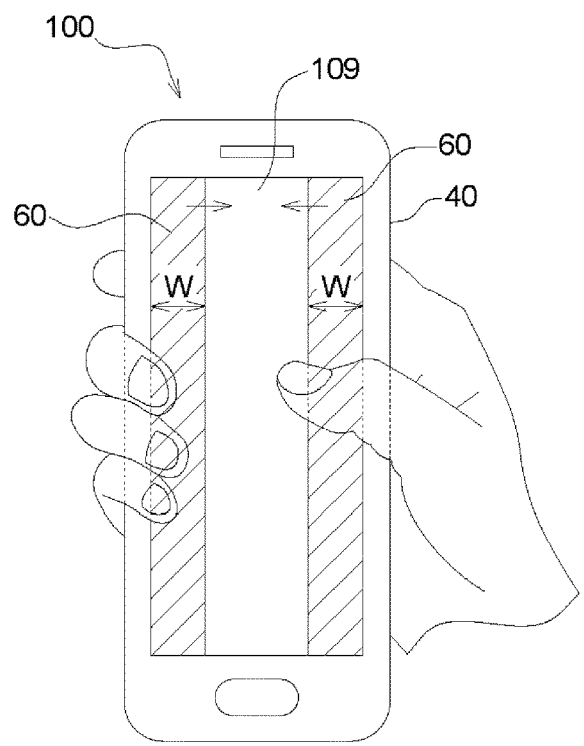
FIG. 16 shows a schematic diagram of a portable electronic device having a particular area to an embodiment of the invention.

Referring to FIG. 16, a particular area of the touch function of touch display screen 109 may be disabled according to a pressing action sensed by the edge sensor 40 of the portable electronic device 100. For example, the touch function of a non-touch region 60 adjacent to the edge sensor 40 is disabled when the processor 102 via the first sensor 104 and/or the second sensor 104 determines that the force of the pressing action (or squeeze action) is higher than a predefined value (e.g., threshold TH1), while a display function of the other region of the touch display screen 109 may be still active. The processor 102 restores the touch function of a non-touch region 60 adjacent to the edge sensor 40, when the force of the pressing action (or squeeze action) is smaller than a predefined value (e.g., threshold TH2). In an embodiment, the touch function of a non-touch region 60 is disabled in the time period PT1 shown in FIG. 10. In an embodiment, with corresponding to a gradually increased pressing force, an area of the non-touch region 60 is gradually increased as being extended towards a center of the touch display screen 109 from the edge of the touch display screen 109. In other words, the width W of the non-touch region 60 may be increased as the pressing force increases sensed by the first sensor 104 and/or the second sensor 104. In another embodiment, the touch function of the whole touch display screen 109 is disabled as long as the processor 102 determines that the force of the pressing action (or the squeeze action) is higher than a predefined value (e.g., threshold TH1) without considering the change of the squeezing force.

In an embodiment, when a plugging-in event or a plugging-out event of a peripheral device is detected by the portable electronic device, a squeezing event sensed by the edge sensor is ignored. The squeezing event may be generated when the squeeze action sensed by the edge sensor occurs during a first time period. The plugging-in event or the plugging-out event occurs during the first time period. The squeeze action may begin within a second time period after the plugging-in event or the plugging-out event occurs.

Figure 17:
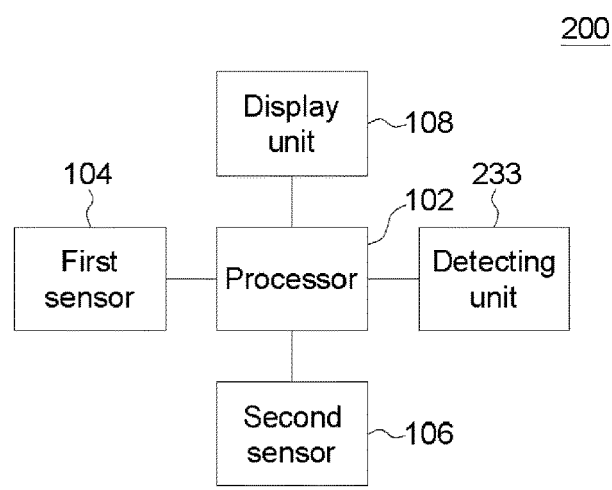
FIG. 17 shows the block diagram of the portable electronic device according to another embodiment of the invention.

Referring to FIG. 17, FIG. 17 shows the block diagram of the portable electronic device 200 according to another embodiment of the invention. The portable electronic device 200 further includes detecting unit 233.

Figure 18:
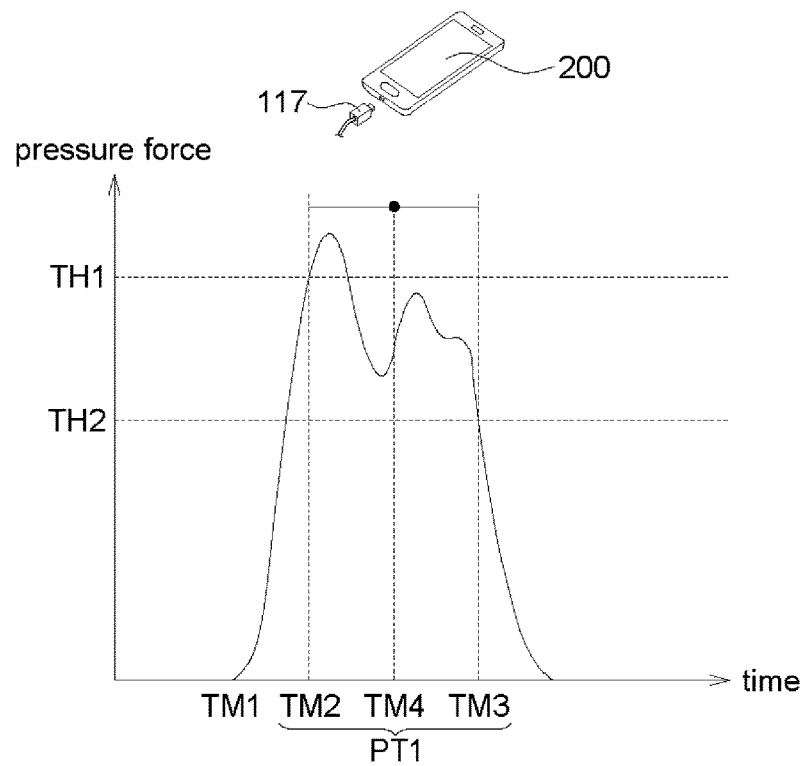
FIG. 18 shows a curve with relation of a time and pressure force according to an embodiment.

For example, referring to FIG. 18, in an embodiment, as a peripheral device 117 (as a client, for example a USB device) which is, for example, an earphone, a lighting device, an electric fan, or a flash drive etc., is detected by the detecting unit 233 to be plugged in or plugged out from the portable electronic device 200 (as a host) at a time point TM4 during the period time PT1, the squeezing event sensed by the edge sensor is ignored. For example, the edge sensor 40 is disabled. Alternatively, the functional action corresponding to the sensed (short/long) squeezing event is canceled (not carried out) by the portable electronic device 200.

In an embodiment, when the plugging-in event or the plugging-out event of the peripheral device 117 is detected by the portable electronic device 200 at a timing point TM4, the edge sensor 40 is disabled for a time period beginning at the timing point TM4, for example between the timing point TM4 and the timing port TM 3, or between the timing point TM4 and a timing point later than the timing port TM 3.

For example, the USB driver of the peripheral device 117 can inform a plugging in or plugging out event to a sensor hub as it happens, and no functional action correspond the state sensed by the edge sensor 40 is triggered to the portable electronic device 200. That is, the squeeze action around the time point TM4 which is between the time point TM2 and the time point TM 3 is canceled. In an embodiment, the squeeze action after the time point TM4 with a specific interval is canceled. For example, the squeeze action during a timing period between the timing point TM4 and the timing port TM 3 may be canceled. The squeeze action during a timing period between the timing point TM4 and a timing point later than the timing port TM 3 may be canceled. Alternatively, the squeeze action after the timing port TM 3 may be canceled.

Figure 19:
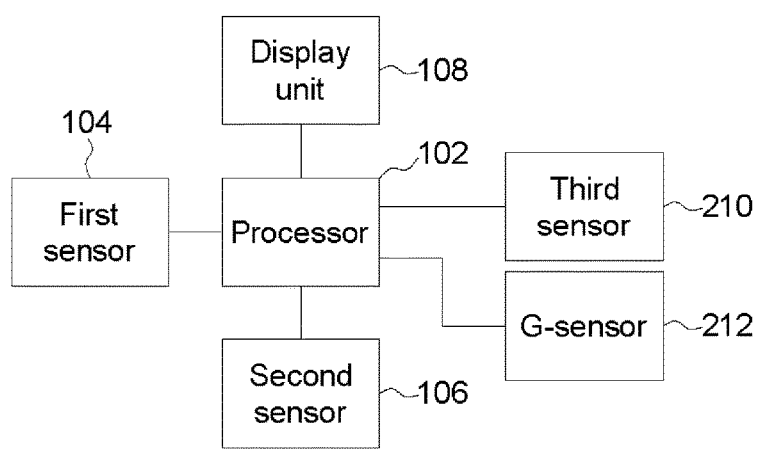
FIG. 19 shows the block diagram of the portable electronic device according to another embodiment of the invention.

Referring to FIG. 19, FIG. 19 shows the block diagram of the portable electronic device 300 according to another embodiment of the invention. The portable electronic device 300 further includes a third sensor 210 and a G sensor 212. The third sensor 210 is, for example, a resistive sensor or an ultrasonic sensor. The third sensor 210 is disposed under the rear cover of the portable electronic device 300. The third sensor 210 includes a number of sensing components which are arranged in two-dimension. When the user touches the rear cover of the portable electronic device 300, these sensing components of the third sensor 210 output the signals. The processor 102 determines whether the user touches the rear cover of portable electronic device 300 according to the signals outputted from the third sensor 210. Besides, the processor 102 determines whether the portable electronic device 300 is shook or flipped according to the signals outputted from the G sensor 212. The user actions may further include shaking the portable electronic device 300, flipping the portable electronic device 300 and palming the portable electronic device 300.

TABLE 2-1

| User action | Status | | | |
|---|---|---|---|---|
| | Screen off (A) | Screen on (Global) (B) | Camera (C) | Video (D) |
| Double tap (10) | None | Zoom in (depends on screen) | Zoom in | Zoom in |
| Double tap and slide (11) | None | Zoom in/out (depends on screen) | Zoom in/out | Zoom in/out |
| Hold and shake (12) | Boost | Boost | Boost | Boost |
| Squeeze and flip the device (13) | None | None | Switch camera | None |
| Flip and palm the device (14) | Silent mode | Silent mode | Silent mode | Silent mode |

TABLE 2-2

| User action | Status | | | |
|---|---|---|---|---|
| | Music (E) | Gaming (F) | Incall (G) | Alarm/alert (H) |
| Double tap (10) | None | Zoom in (depends on game) | None | None |
| Double tap and slide (11) | None | Zoom in/out (depends on game) | None | None |
| Hold and shake (12) | Boost | Boost | Boost | None |
| Squeeze and flip the device (13) | None | None | None | None |
| Flip and palm the device (14) | Silent mode | Silent mode | Silent mode | Silent mode |

TABLE 2-3

| User action | Status | | | |
|---|---|---|---|---|
| | Incoming call (I) | IM/Message with IME (J) | IM/Message without IME (K) | Web/photo (L) |
| Double tap (10) | None | None | None | Zoom in |
| Double tap and slide (11) | None | None | None | Zoom in/out |
| Hold and shake (12) | Boost | Boost | Boost | Boost |
| Squeeze and flip the device (13) | None | None | None | None |
| Flip and palm the device (14) | Silent mode | Silent mode | Silent mode | Silent mode |

Referring to FIG. 19 and Tables 2-1, 2-2 and 2-3, the corresponding operations are performed when the user double taps the rear cover (user action 10) in different statuses of portable electronic device 300. For example, when the screen of the portable electronic device 300 is turned on (status A), the camera of the portable electronic device 300 is launched (status C), the user watches the video (status D), plays the games on the portable electronic device 300 (status F), or the user browses the web/photo (status L), the user double taps on the rear cover of the portable electronic device 300 to zoom in the content displayed on the display unit 108.

The corresponding operations are performed when the user double taps the rear cover and slides on the sides (user action 11) in different statuses of portable electronic device 300. For example, when the screen of the portable electronic device 300 is turned on (status B), the camera of the portable electronic device 300 is launched (status C), the user watches the video (status D), plays the games on the portable electronic device 300 (status F), or the user browses the web/photo (status L), the user double taps on the rear cover and slides on the long sides of the portable electronic device 300 to zoom in/out the content displayed on the display unit 108.

Figure 20:
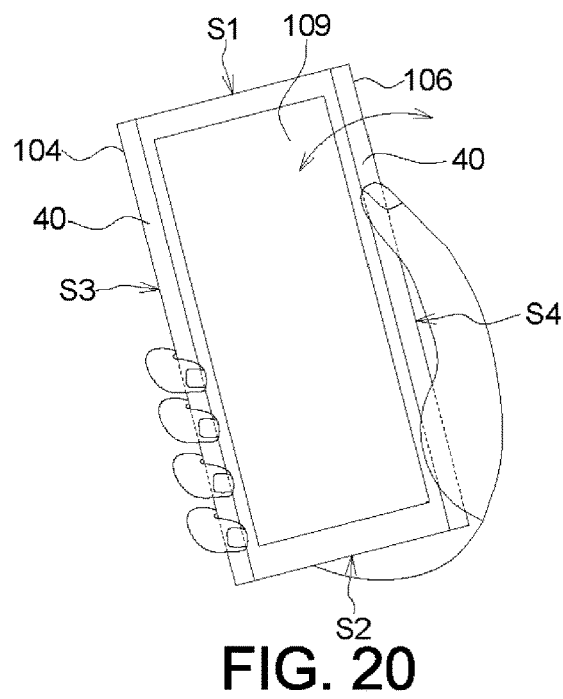
FIG. 20 shows a schematic diagram of the portable electronic device when the user holds and shakes the portable electronic device.

The corresponding operations are performed when the user holds and shakes the portable electronic device 300 (user action 12) in different statuses of portable electronic device 300. For example, when the screen of the portable electronic device 300 is turned on/off (status B/A), a camera of the portable electronic device 300 is launched (status C), the user watches the video (status D), listens to the music (status E), plays the games on the portable electronic device 300 (status F), the user is in a call (status G), the user has an incoming call (status I), the user writes the IM/message with IME (status J), the user writes the IM/message without IME (status K), or the user browses the web/photo (status L), the user holds and shakes the portable electronic device 300 to boost the portable electronic device 300. That is, the user holds and shakes the portable electronic device 300 to enhance data connection, clean the RAM, increase antenna strength, increase CPU/GPU power temporary. In one embodiment, the corresponding operation for the user action "hold and shake" is customizable. That is, the user can reset the corresponding operation. For example, the corresponding operation "boost" is reset to "change theme/wallpaper". Referring to FIG. 20, FIG. 20 shows a schematic diagram of the portable electronic device 300 when the user holds and shakes the portable electronic device 300.

Figure 21:
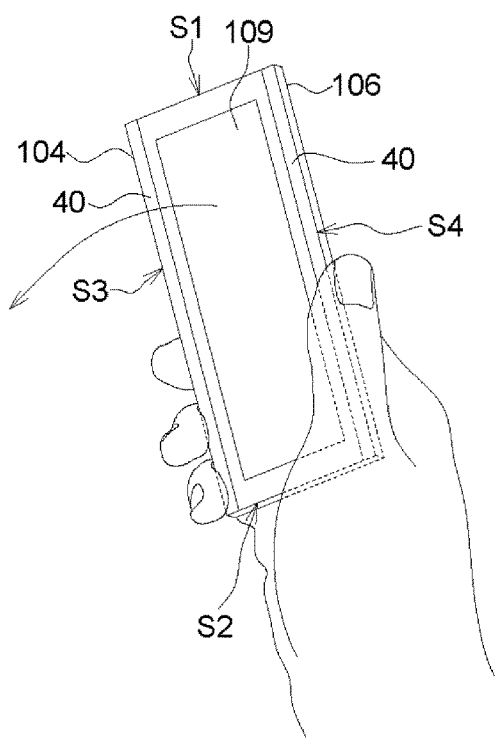
FIG. 21 shows a schematic diagram of the portable electronic device when the user squeezes and flips the portable electronic device.

The corresponding operation is performed when the user squeezes and flips the portable electronic device 300 (user action 13) in a status of portable electronic device 300. For example, when the camera of the portable electronic device 300 is launched (status C), the user squeezes and flips the portable electronic device 300 to switch between main camera and front camera. Referring to FIG. 21, FIG. 21 shows a schematic diagram of the portable electronic device 300 when the user squeezes and flips the portable electronic device 300.

Figure 22:
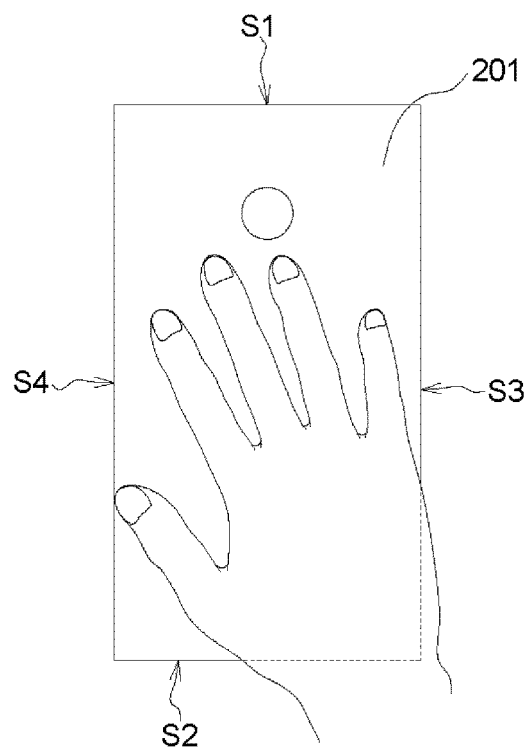
FIG. 22 shows a schematic diagram of the portable electronic device when the user palms the portable electronic device.

The corresponding operations are performed when the user flips and palms the portable electronic device 300 (user action 14) in different statuses of portable electronic device 300. For example, when the screen of the portable electronic device 300 is turned on/off (status B/A), a camera of the portable electronic device 300 is launched (status C), the user watches the video (status D), listens to the music (status E), plays the games on the portable electronic device 300 (status F), the user is in a call (status G), an alarm/alert rings (status H), the user has an incoming call (status I), the user writes the IM/message with IME (status J), the user writes the IM/message without IME (status K), or the user browses the web/photo (status L), the user flips and palms the portable electronic device 300 to turn on a silent mode. Referring to FIG. 22, FIG. 22 shows a schematic diagram of the portable electronic device 300 when the user palms the portable electronic device 300. For example, the user flips the portable electronic device 300 and places the portable electronic device 300 on a plane, for example a table, and palms on the rear cover 201 of the portable electronic device 300 to turn on the silent mode of the portable electronic device 300 when the user has a meeting.

In an embodiment, when it is sensed that the portable electronic device 300 is in a stationary state for a period of time by the G sensor 212, the edge sensor 40 of the portable electronic device 300 is disabled. In an embodiment, when it is sensed by the G sensor 212 that the portable electronic device 300 is changed from the stationary state to a non-stationary state, the squeezing event occurring within a time period after the time point of starting being in the non-stationary state is ignored.

A (x, y, z) coordinate of the portable electronic device 300 can be sensed by using a G sensor in the portable electronic device 300. If the coordinate of the portable electronic device 300 is sensed by the G sensor as being at (x, y, z)=(0, 0, 9.8) for a period of time, it can be judged that the portable electronic device 300 is rested on a supporter such as a desk, table, etc., for a period of time, and the edge sensor 40 is disabled during resting state.

If the coordinate of the portable electronic device 300 is judged as being in a resting state for a period of time, during an instantaneous moving action of a short period time of the portable electronic device 300 occurring from the resting state, the edge sensor is disabled or no function of the device is triggered even it is sensed that the pressing force reaches the squeezing threshold TH1 by the edge sensor 40.

The instantaneous moving action of the portable electronic device 300 occurring from the resting state may be resulted from a holding action from the supporter by the user, a moving of the supporter that may be resulted from a shock, etc.

The G sensor in the portable electronic device 300e may be used to sense an amount of movement (changed quantity of G-value) of the portable electronic device 300. In an embodiment, if the changed quantity of G-value reaches a specific quantity GV during the instantaneous moving action, an interrupt mode is determined to disable the edge sensor 40 or disable the touch function of the portable electronic device 300 corresponding to the squeeze action sensed determined by the processor 102.

If the amount of movement (changed quantity of G-value) of the portable electronic device 300 sensed by the G sensor is judged to be resulted from a user's action not being a normal squeeze action (for example, a holding action of the user with fast swing arms during exercising), the edge sensor 40 or the touch function of the portable electronic device 300 corresponding to the squeeze action determined by the processor 102 is disabled.

The G sensor of the portable electronic device 300 may be used to sense an orientation angle of the portable electronic device 300. If the touch display screen 109 is sensed by the G sensor as being facing down to a ground when the coordinate equals to (0, 0, −9.8), the edge sensor 40 or the touch function of the portable electronic device 300 corresponding to the squeeze action determined by the processor 102 is disabled.

Figure 23:
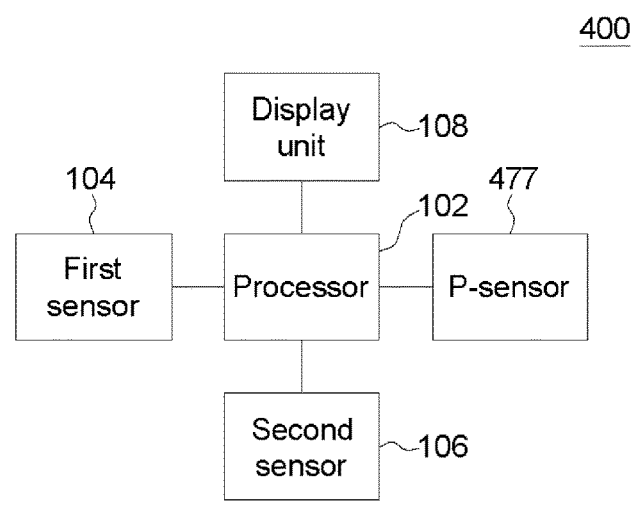
FIG. 23 shows the block diagram of the portable electronic device according to another embodiment of the invention.

Referring to FIG. 23, FIG. 23 shows the block diagram of the portable electronic device 400 according to another embodiment of the invention. The portable electronic device 400 further includes a proximity sensor 477. The proximity sensor 477 may detect objects by emitting an electrostatic or electromagnetic field and monitoring the behavior of the generated field over a period of time. Thus, an object near the device will change the generated field as the object approaches the proximity sensor 477.

The proximity sensor 477 of the portable electronic device 400 may be used to detect an external object placed in proximity to the front face of the portable electronic device 400. If it is judged by the proximity sensor 477 that the portable electronic device 400 is in a near state to the external object (for example, when the portable device is put in a pocket of the user) during a pressing action sensed by the edge sensor 40, then the edge sensor 40 or the touch function of the portable electronic device 400 corresponding to the squeeze action determined by the processor 102 is disabled during the near state of the portable electronic device 400. In an embodiment, if it is judged by the proximity sensor 477 that the portable electronic device 400 is in the near state to the external object, during the near state, the edge sensor 40 or the touch function of the portable electronic device 400 corresponding to the squeeze action determined by the processor 102 is disabled and the touch display screen 109 is screened off even though the portable electronic device 400 receives an incoming call.

In an embodiment, when the user holds the portable electronic device and some contents are displayed, the timer of screen is extended, such that the screen is not turned off when the user reads the contents. In an embodiment, when the screen of the portable electronic device is turned off, the user squeezes the portable electronic device to wake up the portable electronic device. In an embodiment, when the screen of the portable electronic device is turned off, the user double taps on the screen to glimpse the time/date/battery power. In an embodiment, when the screen of the portable electronic device is turned on and the user holds the portable electronic device, the touch area of the screen is decreased to decrease the miss-touch. In an embodiment, when the user has an incoming call, the user holds the portable electronic device and puts the portable electronic device close to the ear to answer the incoming call. In an embodiment, when the user holds the portable electronic device, the left hand or the right hand is identified to match the most possible angel of fingerprint, to fasten the fingerprint recognition. In an embodiment, when the fingers fading the hold, it is determined that the user is falling asleep. In an embodiment, when the user is in dangerous, the user squeezes the portable electronic device 5 seconds for SOS.

Figure 24:
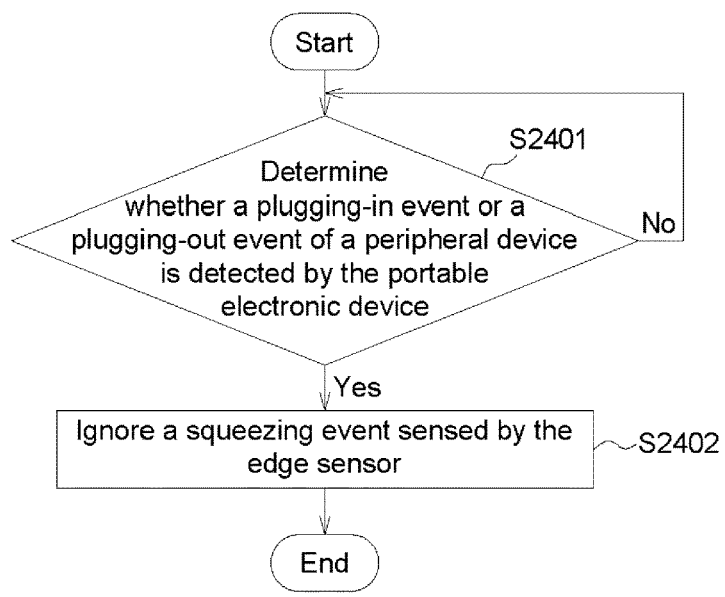
FIG. 24 shows a flowchart of an operating method for a portable electronic device.

In another embodiment, an operating method for a portable electronic device is provided. Referring to FIG. 24, a flowchart of an operating method for a portable electronic device is shown. The portable electronic device includes a body and an edge sensor disposed adjacent to an edge of the body. The operating method is described with the following steps. In step S2401, it is determined that whether a plugging-in event or a plugging-out event of a peripheral device is detected by the portable electronic device. If yes, step S2402 is performed. In step S2402, a squeezing event sensed by the edge sensor is ignored. The squeezing event is generated when a squeeze action sensed by the edge sensor occurs during a first time period. The plugging-in event or the plugging-out event occurs during the first time period or the squeeze action begins within a second time period after the plugging-in event or the plugging-out event occurs.

Figure 25:
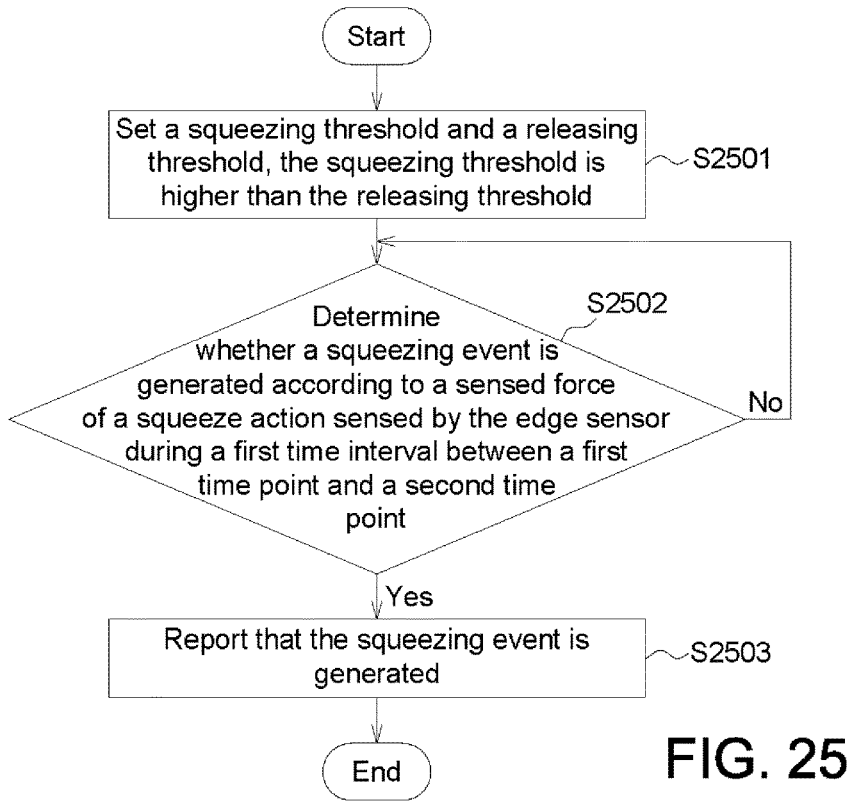
FIG. 25 shows a flowchart of an operating method for a portable electronic device.

In still another embodiment, an operating method for a portable electronic device is provided. Referring to FIG. 25, a flowchart of an operating method for a portable electronic device is shown. The portable electronic device includes a body and an edge sensor disposed adjacent to an edge of the body. The operating method is described with the following steps. In step S2501, a squeezing threshold and a releasing threshold are set. The squeezing threshold is higher than the releasing threshold. In step S2502, whether a squeezing event is generated according to a sensed force of a squeeze action sensed by the edge sensor during a first time interval between a first time point and a second time point is determined. If yes, step S2503 is performed. In step S2503, it is reported that the squeezing event is generated. The sensed force at the first time point reaches the squeezing threshold. The sensed force at the second time point reaches the releasing threshold. The second time point is later than the first time point, and the sensed force is higher than the releasing threshold during the first time period.

Figure 26:
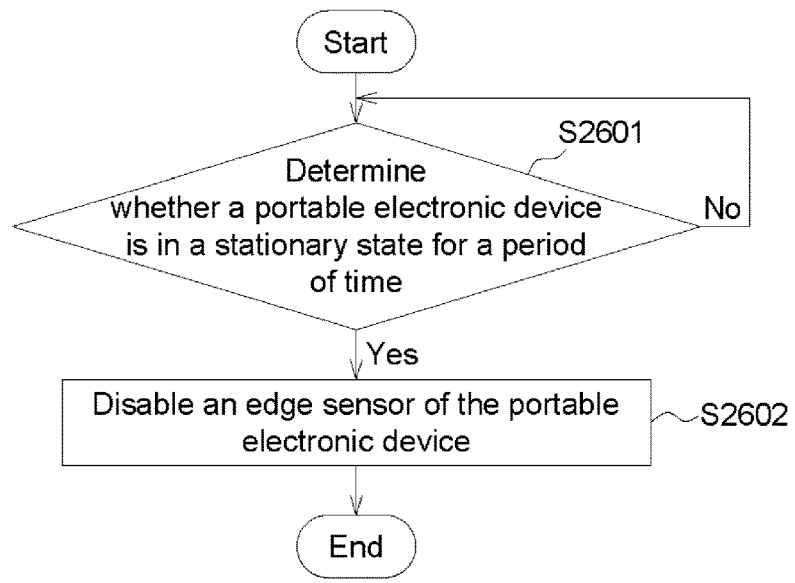
FIG. 26 shows a flowchart of an operating method for a portable electronic device.

In an embodiment, an operating method for a portable electronic device is provided. Referring to FIG. 26, a flowchart of an operating method for a portable electronic device is shown. The operating method is described with the following steps. In step S2601: it is determined that whether a portable electronic device is in a stationary state for a period of time. If yes, step S2602 is performed. In step S2602, an edge sensor of the portable electronic device is disabled.

Figure 27:
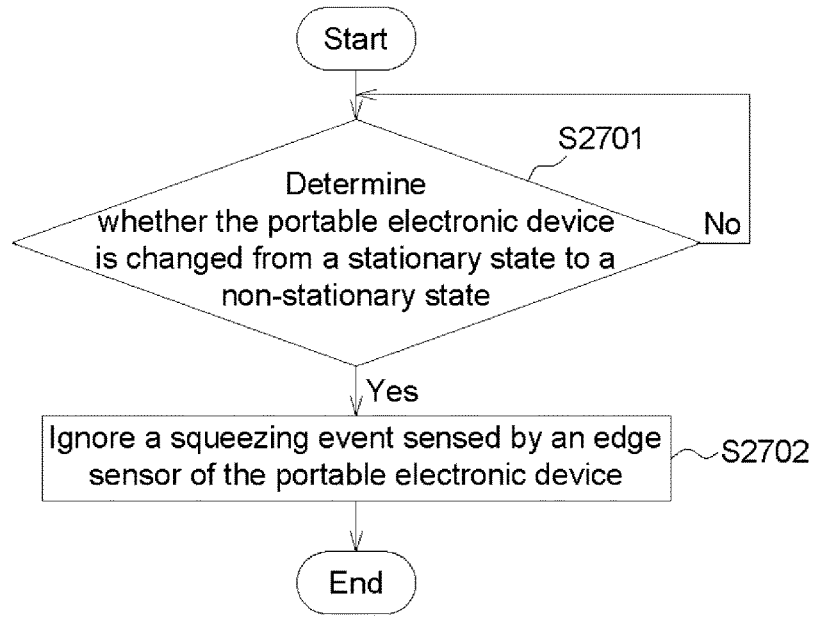
FIG. 27 shows a flowchart of an operating method for a portable electronic device.

In an embodiment, an operating method for a portable electronic device is provided. Referring to FIG. 27, a flowchart of an operating method for a portable electronic device is shown. The operating method is described with the following steps. In step S2701: it is determined that whether a portable electronic device is changed from a stationary state to a non-stationary state. If yes, step S2702 is performed. In step S2702, a squeezing event sensed by the edge sensor is ignored. The squeezing event occurs within a time period after the time point at which the non-stationary state of the portable electronic device starts.

Figure 28:
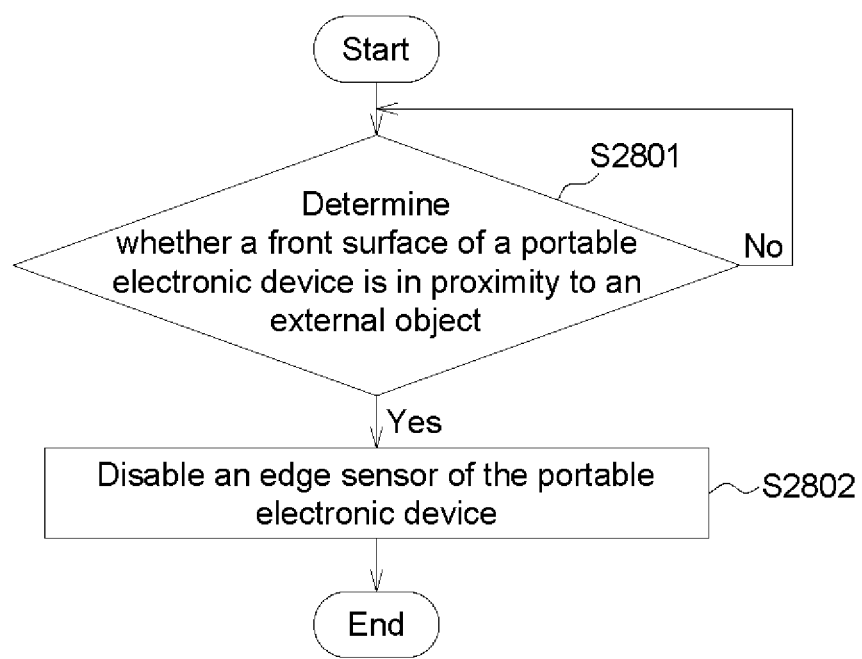
FIG. 28 shows a flowchart of an operating method for a portable electronic device.

In an embodiment, an operating method for a portable electronic device is provided. Referring to FIG. 28, a flowchart of an operating method for a portable electronic device is shown. The operating method is described with the following steps. In step S2801: it is determined that whether a front surface of a portable electronic device is in proximity to an external object. If yes, step S2802 is performed. In step S2802, an edge sensor of the portable electronic device is disabled.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An operating method for a portable electronic device, wherein the portable electronic device comprises a body and an edge sensor disposed adjacent to an edge of the body, a squeezing event is generated according to a squeeze action sensed by the edge sensor, and the operating method comprises:
   in response to determining that a plugging-in event or a plugging-out event of a peripheral device is detected by the portable electronic device, ignoring the squeezing event;
   wherein the squeezing event is ignored in response to determining that the squeeze action sensed by the edge sensor and one of the plugging-in event and the plugging-out event occur during a first time period or in response to determining that the squeeze action begins within a second time period after the plugging-in event or the plugging-out event occurs.

2. The operating method for the portable electronic device according to claim 1, further comprising:
ignoring the squeezing event sensed by the edge sensor for a third time period which begins at a timing point when one of the plugging-in event and the plugging-out event of the peripheral device is detected by the portable electronic device at the timing point.

3. The operating method for the portable electronic device according to claim 1, wherein the portable electronic device further comprises a touch display screen disposed on the body, the touch display screen has an area adjacent to the edge sensor, and the method further comprises:
disabling a touch function of the area of the touch display screen in response to determining that the squeezing event is generated according to the squeezing action sensed by the edge sensor.

4. The operating method for the portable electronic device according to claim 3, wherein a width of the area whose touch function is disabled increases from the edge of the body adjacent to the edge sensor as a sensed force of the squeeze action increases.

5. The operating method for the portable electronic device according to claim 1, wherein the portable electronic device further comprises a touch display screen disposed on the body, and the method further comprises:
disabling a touch function of the touch display screen in response to determining that the squeezing event is generated according to the squeezing action sensed by the edge sensor.

6. The operating method for the portable electronic device according to claim 1, further comprising:
determining the squeezing event is generated in response to determining that a sensed force of the squeeze action detected by the edge sensor reaches to a squeezing threshold at a first time point and reaches to a releasing threshold at a second time point and a fourth time period between the first time point and the second time point is longer that a time threshold, wherein the squeezing threshold is higher than the releasing threshold, the second time point is later than the first time point, and the sensed force is higher than the releasing threshold during the fourth time period.

7. The operating method for the portable electronic device according to claim 1, further comprising:
determining whether the portable electronic device is in a stationary state for a period of time; and
disabling the edge sensor in response to determining that the portable electronic device is in the stationary state for the period of time.

8. The operating method for the portable electronic device according to claim 1, further comprising:
determining whether the portable electronic device is changed from a stationary state to a non-stationary state; and
in response to determining that the portable electronic device is changed from the stationary state to the non-stationary state, ignoring the squeezing event which occurs within a fifth time period after a time point of being in the non-stationary state.

9. The operating method for the portable electronic device according to claim 1, further comprising:
ignoring the squeezing event in response to determining that the portable electronic device is detected to be swung.

10. The operating method for the portable electronic device according to claim 1, further comprises:
disabling the edge sensor in response to determining that an object is detected in proximity to a front face of the portable electronic device.

11. The operating method for the portable electronic device according to claim 1, further comprises:
performing a predefined function according to the squeezing event.

12. A non-transitory computer readable recording medium for storing one or more programs, the one or more programs causing a processor to perform the method according to claim 1 after the one or more programs are loaded on a computer and are executed.

13. A portable electronic device, comprising:
a body; and
an edge sensor disposed adjacent to an edge of the body, wherein a squeezing event is generated according to a squeeze action sensed by the edge sensor;
wherein in response to determining that a plugging-in event or a plugging-out event of a peripheral device is detected by the portable electronic device, the squeezing event is ignored by the portable electronic device, wherein the squeezing event is ignored in response to determining that the squeeze action sensed by the edge sensor and one of the plugging-in event and the plugging-out event occur during a first time period or in response to determining that the squeeze action begins within a second time period after the plugging-in event or the plugging-out event occurs.

14. The portable electronic device according to claim 13, wherein when one of the plugging-in event and the plugging-out event of the peripheral device is detected by the portable electronic device at a timing point, the squeezing event sensed by the edge sensor is ignored for a third time period which begins the timing point.

15. The portable electronic device according to claim 13, further comprising a touch display screen disposed on the body, wherein the touch display screen has an area adjacent to the edge sensor; in response to determining that the squeezing event is generated according to the squeezing action sensed by the edge sensor, a touch function of the area of the touch display screen is disabled by the portable electronic device.

16. The portable electronic device according to claim 13, further comprising a touch display screen disposed on the body, wherein in response to determining that the squeezing event is generated according to the squeezing action sensed by the edge sensor, a touch function of the touch display screen is disabled by the portable electronic device.

17. The portable electronic device according to claim 13, wherein the edge sensor is implemented by at least one of a pressure sensor and a touch sensor.

18. The portable electronic device according to claim 13, further comprising a G sensor disposed in the body, wherein in response to determining that the portable electronic device in a stationary state for a period of time determining by the G sensor, the edge sensor is disabled by the portable electronic device.

19. The portable electronic device according to claim 18, further comprising a proximity sensor in the body, wherein in response to an object in proximity to a front face of the portable electric device sensed by the proximity sensor, the edge sensor is disabled by the portable electronic device.

20. The portable electronic device according to claim 13, wherein the squeezing event is generated in response to determining that a sensed force of the squeeze action detected by the edge sensor reaches to a squeezing threshold at a first time point and reaches to a releasing threshold at a second time point and a fourth time period between the first time point and the second time point is longer than a time threshold, wherein the squeezing threshold is higher than the releasing threshold, the second time point is later than the first time point, and the sensed force is higher than the releasing threshold during the fourth time period.

* * * * *